(12) United States Patent
Pailles et al.

(10) Patent No.: US 8,588,415 B2
(45) Date of Patent: Nov. 19, 2013

(54) METHOD FOR SECURING A TELECOMMUNICATIONS TERMINAL WHICH IS CONNECTED TO A TERMINAL USER IDENTIFICATION MODULE

(75) Inventors: Jean-Claude Pailles, Epron (FR); Fabien Venries, La Garenne Colombes (FR); Guillaume Bruyere, Paris (FR); Alexandre Frey, Villepreux (FR)

(73) Assignees: France Telecom, Paris (FR), part interest; Trusted Logic, Versailles (FR), part interest ( * ) Notice: Subject to any disclaimer, the term of this patent is extended or adjusted under 35 U.S.C. 154(b) by 1605 days.

(21) Appl. No.: 11/791,483

(22) PCT Filed: Nov. 2, 2005

(86) PCT No.: PCT/FR2005/002726
§ 371 (c)(1),
(2), (4) Date: May 24, 2007

(87) PCT Pub. No.: WO2006/056669
PCT Pub. Date: Jun. 1, 2006

(65) Prior Publication Data
US 2007/0286373 A1      Dec. 13, 2007

(30) Foreign Application Priority Data

Nov. 25, 2004    (FR) ..................................... 04 12760

(51) Int. Cl.
*H04K 1/00* (2006.01)
*H04M 1/66* (2006.01)

(52) U.S. Cl.
USPC ........... 380/247; 380/255; 380/259; 380/277; 726/2; 726/4; 726/5; 726/6; 726/9; 726/10; 726/18; 726/20; 726/26; 713/165; 713/171; 713/172; 713/173; 713/182; 713/193; 713/194

(58) Field of Classification Search
USPC ........................... 380/247; 455/410–411, 413
See application file for complete search history.

(56) References Cited

U.S. PATENT DOCUMENTS

| | | | | |
|---|---|---|---|---|
| 5,721,781 A | * | 2/1998 | Deo et al. | 705/67 |
| 6,124,799 A | | 9/2000 | Parker | |
| 6,575,372 B1 | * | 6/2003 | Everett et al. | 235/492 |
| 7,362,869 B2 | * | 4/2008 | Landrock | 380/277 |

(Continued)

FOREIGN PATENT DOCUMENTS

| | | |
|---|---|---|
| EP | 1 289 326 A1 | 3/2003 |
| FR | 2 831 362 | 4/2003 |

*Primary Examiner* — Kambiz Zand
*Assistant Examiner* — Jenise Jackson
(74) *Attorney, Agent, or Firm* — Young & Thompson

(57) ABSTRACT

A method of securing a telecommunication terminal that is connected to a module used to identify a user of the terminal is described. The method includes a step including executing a procedure in which the terminal is matched to the identification module, consisting in: securely loading a first software program including a data matching key onto the identification module; securely loading a second software program which can operate in conjunction with the first software program onto the telecommunication terminal; transmitting a data matching key that corresponds to that of the first software program to the second software program; storing the transmitted data matching key in the secured storage zone of the telecommunication terminal; and conditionally submitting every response from the first software program to a request from the second software program upon verification at the true value of the valid possession of the data matching key by the second program.

20 Claims, 2 Drawing Sheets

(56) References Cited

U.S. PATENT DOCUMENTS

| | | | |
|---|---|---|---|
| 2004/0019564 A1* | 1/2004 | Goldthwaite et al. | 705/44 |
| 2004/0159700 A1* | 8/2004 | Khan et al. | 235/380 |
| 2005/0069137 A1* | 3/2005 | Landrock | 380/278 |
| 2005/0227669 A1* | 10/2005 | Haparnas | 455/410 |
| 2006/0189298 A1* | 8/2006 | Marcelli | 455/411 |
| 2008/0010470 A1* | 1/2008 | McKeon et al. | 713/194 |
| 2008/0065550 A1* | 3/2008 | Zhu et al. | 705/51 |
| 2008/0091957 A1* | 4/2008 | Everett et al. | 713/194 |
| 2008/0147509 A1* | 6/2008 | Ghosh et al. | 705/17 |
| 2009/0030843 A1* | 1/2009 | Hoffman et al. | 705/67 |
| 2009/0030844 A1* | 1/2009 | Hoffman et al. | 705/67 |
| 2010/0235282 A1* | 9/2010 | Hoffman et al. | 705/67 |

* cited by examiner

METHOD FOR SECURING A TELECOMMUNICATIONS TERMINAL WHICH IS CONNECTED TO A TERMINAL USER IDENTIFICATION MODULE

The present invention relates to a method for securing a telecommunications terminal which is connected to a terminal user identification module.

It is used particularly, but not exclusively, for mobile communication terminals which are provided for receiving a secure module for authentication of the user. These terminals conform, for example, to the GSM standard (Global System for Mobile Communications) or UMTS standard (Universal Mobile Telecommunication System). More generally, it is also used for any terminal which comprises telecommunications means which are designed for receiving an authentication module of this type.

A number of applications which use a public data transmission network, such as the Internet network, involve remotely authenticating the user. Such applications require the existence of a user right to be determined or require information that he is providing to be authenticated, or require the transmission, via the network, of an item of confidential information to a user who has been correctly identified. These operations involve being able to identify the user in a reliable and secure manner. To this end, an electronic device is generally used, such as a chip card, or an authentication or security token which stores keys and is capable of carrying out encryption procedures, in particular for identification in order to prove that he holds a key or in order to decipher a confidential message.

Mobile telephones, in particular of the GSM type, generally contain an identification module in the form of a chip card which is referred to as a SIM card (Subscriber Identification Module) which allows the owner of the mobile telephone to be identified by the telephone network. In order to be able to use his mobile telephone, the user must produce a confidential code which is verified by the SIM card. To this end, the SIM card has the encryption functionalities mentioned above. It can therefore be used in an application which involves the generation of an electronic signature. For example, the signature may relate to the terms of a transaction between a provider and the user of the mobile telephone, taking into account that the user has previously been authenticated by his mobile telephone by entering his confidential code or a confidential code which is dedicated to the function of signature generation and by the fact that this confidential code is verified by the SIM card.

The SIM card can therefore be used in e-commerce applications in order to electronically sign a transaction or in an application for transmission of a confidential message, by means of encrypting or decrypting the message using a key which is contained in this SIM card.

However, it has been found that the security provided by the SIM card is not in itself sufficient to provide a convincing level of security, in particular with the appearance of third generation mobile telephones, that is to say, telephones which have the capacity to receive and contain a plurality of applications supplied by different providers. In this context, it is not possible to ensure that the terminal used does not contain faults, viruses, or Trojan horses which, for example, allow encrypted messages to be retransmitted to another terminal.

It is therefore necessary to prove remotely that the assembly comprising the mobile terminal and software loaded in the terminal is integral and has the required security properties.

To this end, the mobile terminal can protect itself against viruses and Trojan horses by accepting to download new applications only when it can authenticate the origin and the integrity thereof, or, if this is not the case, by running them so that they cannot in any case modify the whole of the terminal. It is further necessary to provide an authentication function which allows remote providers to verify that the mobile terminal really has the required security properties.

The SIM card is insufficient to provide an authentication function of this type given that it can be removed and can be installed in any terminal.

Furthermore, it is not a matter of preventing a user from being able to use the same SIM card with a plurality of terminals, in particular in order to change terminal.

The patent application FR 0304979 filed on 23 Apr. 2003 describes a method for securing a mobile terminal which is connected to a terminal user identification module which comprises a step for carrying out a pairing operation in which:

the terminal transmits, to the identification module which is connected to the terminal, information for identification of the terminal, and the identification module compares the identification information received from the terminal with terminal identification information stored in a memory and transmits the result of the comparison to the terminal. If the identification information is not recognised by the identification module, the functions which require a high level of security and which are installed in the terminal are not accessible.

A number of applications which require a high level of security, such as commercial transactions, are broken down into two applications: a first application in the mobile for dialogue with the user and a second application in the SIM (SIMlet) for the security logic and in particular the storage of encryption keys.

An example of such a third party application is EMV payment (Eurocard, Mastercard, Visa). EMV is the reference standard in this instance. The client-side application is broken down into two components:

1. an application in the mobile for dialogue with the user, interface with a "point of sale" terminal and other specific functions of the bank (customer relations, receipt management, etc.);
2. an application in the SIM for the EMV logic with the EMV keys;

this type of distribution between the SIM and the mobile is typical of this type of application since it meets requirements well.

The SIM which is designed to be a secure means contains the most sensitive portion of the applications, containing keys and operations, knowledge or modification of which could bring about significant occurrences of fraud to the benefit, for example, of the user of the mobile.

The mobile, which has much more significant and varied processing capacities, contains the remainder of the application required, for example, for the user interfaces (display/keyboard) or the network interface. It may also be subject to various attacks which are, however, of a lesser importance and extent.

These applications must be able to be downloaded, for example, via OTA (Over the Air) in order to simplify the operations which the user has to carry out.

In this instance, it is therefore necessary for the pairing between the terminal and the SIM card to be able to be remotely verified by the downloading server which will consider that this downloading of a sensitive application is logical only when it is carried out in a mobile which has a significant level of security properties.

Finally, this pairing must take into account not only the fact that a mobile and a SIM card are associated but must also be influenced by the software state present in the mobile. From the time when it is possible to download programmes into the mobile, it may be advantageous to verify the software state present in the mobile.

An object of the invention is therefore to initialise a pairing between a SIM card and a mobile terminal under the control of a third party which is capable of authorising the mobile to be capable of supporting security applications.

The invention therefore relates to a method for securing a telecommunications terminal which is connected to a terminal user identification module, comprising a step for carrying out a procedure for pairing the terminal with the identification module, involving:

loading in a secure manner a first item of software which comprises a pairing key on the identification module,
  loading in a secure manner a second item of software which is capable of operating in conjunction with the first item of software on the telecommunications terminal,
  transmitting a pairing key which corresponds to that of the first item of software to the second item of software,
  storing the pairing key transmitted in a secure storage zone of the telecommunications terminal;
  prior to any response from the first item of software to a request (14) from the second item of software, verifying (15, 16) that the pairing key of the second item of software stored on the communications terminal is valid;
  responding to the request when and only when the second item of software is in valid possession of the pairing key.

Other features of the invention are:

the transmission of the pairing key to the second item of software is conditional upon a procedure for authorising the telecommunications terminal;
  since the terminal has means for identification and authentication of the terminal, the procedure for authorising the terminal is carried out automatically by means of verification, by the first item of software loaded on the identification module, or by an authentication server, of the validity of the identification and authentication means;
  the identification and authentication means comprise an RSA key pair and a certificate transmitted by a certification authority and the verification of the validity of the means involves the authentication of the RSA key pair and the certificate;
  the verification of the possession of the pairing key by the second item of software is carried out via a "challenge-response" process from the first item of software to the second item of software;
  the identification module comprises at least a third item of software which is capable of operating with a complementary item of software loaded on the terminal and such that it responds to a request from the complementary item of software thereof only after having verified with the first item of software that the second item of software is in valid possession of a pairing key;
  the pairing key serves to establish a session key which allows the exchanges between the terminal and the identification module to be encrypted;
  the verification of the pairing key by the first item of software further involves the positioning of flags which mark a difference between the configuration recorded in the identification module and the current configuration of the telecommunications terminal;
  the flags and the configuration information may be read and updated in a secure manner by means of an authentication server.

Another aspect is a system for securing a telecommunications terminal which is connected to a terminal user identification module comprising:

means for secure loading and storage of a first item of software comprising a pairing key in the identification module;
  means for secure loading of a second item of software which is capable of operating in conjunction with the first item of software on the telecommunications terminal,
  means for secure loading and storage of a pairing key of the second item of software, and
  means for communicating between the first and the second item of software comprising means for validating the pairing key of the second item of software which are capable of authorising communication only after verification that the second item of software is in valid possession of the pairing key.

Another aspect of the invention is a telecommunications terminal which comprises means for communicating with a user identification module comprising means for loading, storing and executing a second item of software which is capable of operating with a first item of software which is present on the identification module, and means for secure storage of a pairing key, which means are connected to means for validating this pairing key using the first item of software which is present on the identification module.

Another aspect of the invention is a user identification module which comprises means for communicating with a telecommunications terminal, and means for secure loading and storage of a pairing key which corresponds to a pairing key which is stored on the terminal, and a first item of software which is capable of operating with a second item of software which is present on the terminal, means for validating the pairing key of the terminal from the pairing key of the module, which means are capable of authorising communication only after verification that the second item of software is in valid possession of the pairing key.

Another aspect of the invention is a software product which comprises a first module which is used on a telecommunications terminal and a second module which is used on a module for identification of a user of the telecommunications terminal, for implementing the method.

The invention will be better understood from a reading of the description, given purely by way of example, and with reference to the appended drawings, in which.

Figure 1:
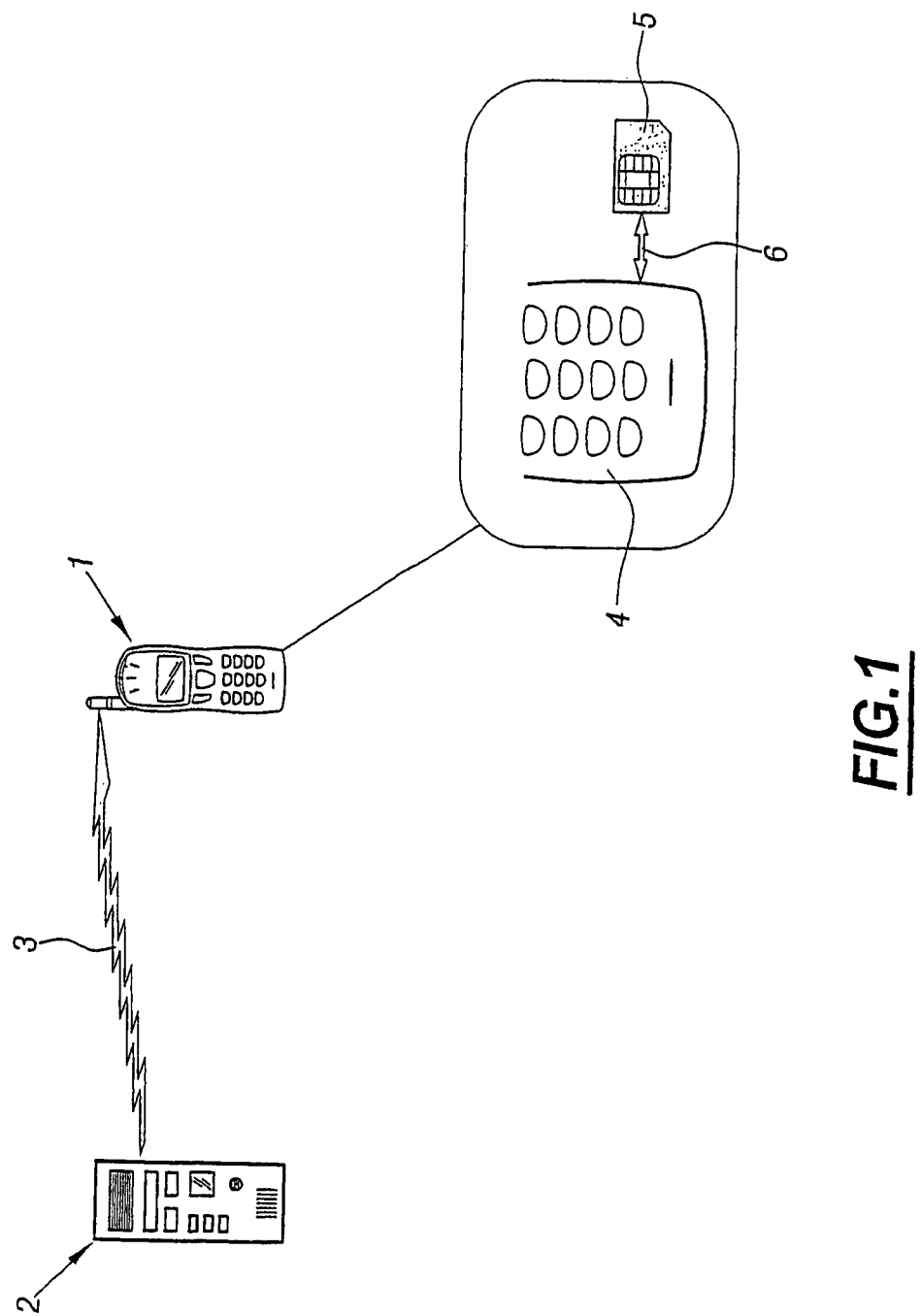
FIG. 1 is a schematic diagram of the elements used by a first embodiment of the invention.

The method according to the invention, FIG. 1, is implemented by a mobile telephone 1 which is configured to communicate with other terminals (not illustrated) or servers 2 which are controlled by service operators, via a telephone network 3. In order to allow the operator of the network 3 to identify a user of a mobile telephone 1 of this type, the mobile telephone comprises the terminal 4 itself and a removable identification device 5, for example, of the microcircuit or microprocessor type, and connection means 6 for connecting to a card of this type. In a GSM or UMTS mobile network, this identification device 5 is referred to as a "Subscriber Identification Module" (SIM).

Figure 2:
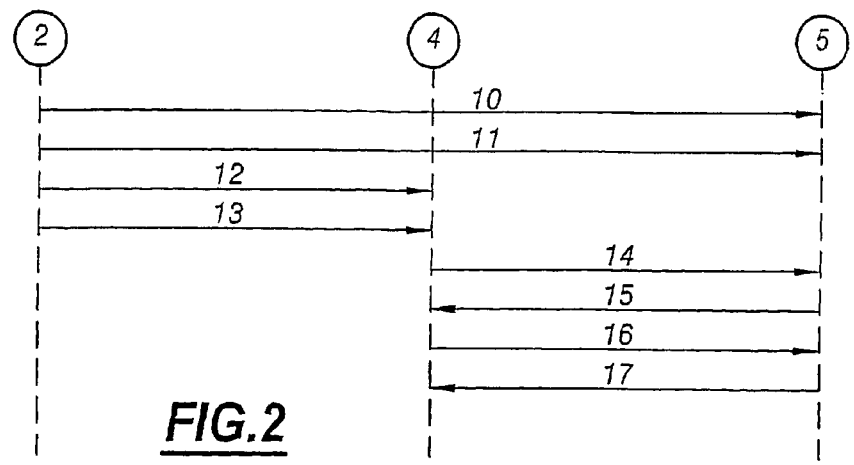
FIG. 2 is a diagram of the data flows of this first embodiment.
Figure 3:
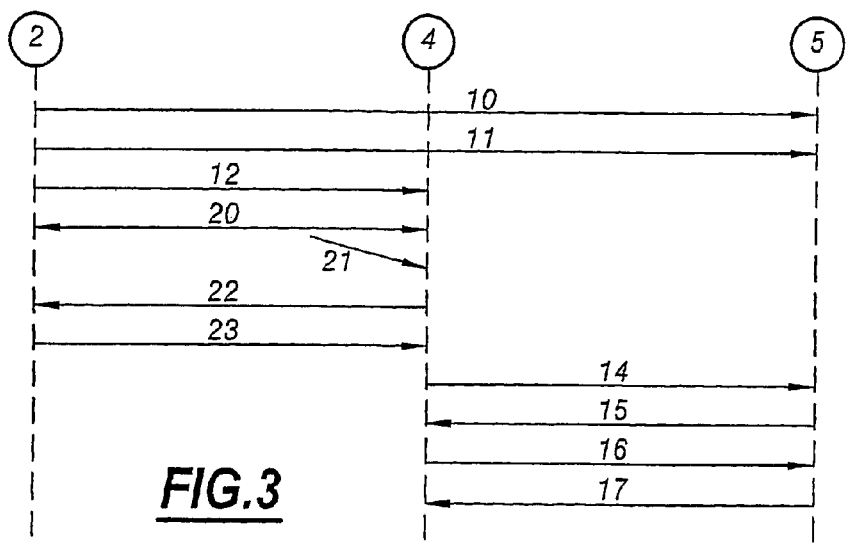
FIG. 3 is a diagram of the data flows in a second embodiment.
Figure 4:
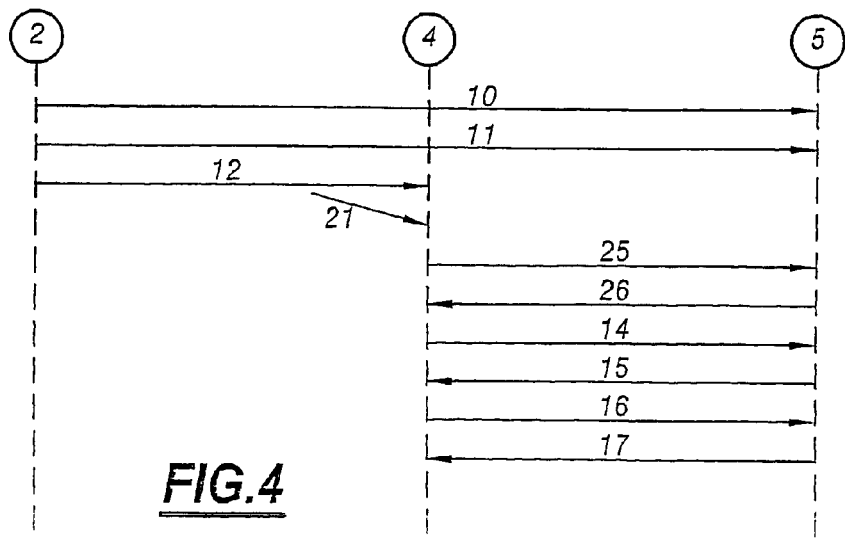
FIG. 4 is a diagram of the data flows in a third embodiment.

FIGS. 2, 3 and 4 illustrate the different process flows between the elements described above. Each element is illustrated with a vertical line. Each transfer of data is indicated with a horizontal arrow whose direction indicates the direction of transfer (the exchanges linked strictly to the protocol used are not illustrated for reasons of clarity, a person skilled in the art being able to reproduce them readily), the same reference corresponding to an identical or similar transfer. The passage of time of the method is illustrated by a downward movement of the Figure.

As indicated in the preamble of this description, a security software application is therefore considered which is composed of two modules, or items of software, which function in co-operation, a first item of software which can be installed on the SIM card 5 and a second item of software which can be installed on the terminal 4.

In a first step 10, FIG. 2, the first item of software is installed in the SIM card in a secure manner. This is carried out by creating a secure channel between the SIM card 5 and the server 2 of the software operator. This secure channel has, for example, been created under the control of encryption keys of the operator of the network.

An example of a creation of this type is the creation of a banking security zone on the SIM card by the operator, the operator allocating a temporary access key $k_t$ to this zone, then transferring this key $k_t$ to the third-party operator, generally a bank, so that he personalises this zone in a secure manner.

The creation of this secure channel between the operator 2 and the SIM card 5 allows the operator to transfer at 11, to the first item of software, personalisation elements, including a pairing key $k_a$.

It should be noted that, in an obvious variant of the method, the personalisation of the first item of software may be carried out by the operator 2 and a single transfer of the first item of software with the pairing key $k_a$ thereof is carried out.

After the SIM card 5 has received its first item of software and the pairing key $k_a$, the second item of software is downloaded at 12 in a secure manner on the terminal. This securing of the transfer may, for example, make use of the presence on the terminal of a certificate which belongs to the operator of the network.

After having ensured that the second item of software has been correctly installed on the terminal, the operator transmits at 13 a pairing key $k'_a$ to the second item of software. This pairing key $k'_a$ corresponds to the pairing key $k_a$ of the first item of software.

The term "correspond" is intended to refer to the fact that the key pair ($k_a$, $k'_a$) corresponds to an encryption relationship. In this manner, in the case of a symmetrical algorithm of the type 3DES or AES, the two keys $k_a$ and $k'a$ are identical.

This pairing key $k'a$ is then stored in a permanent manner by the second item of software in a secure zone.

When the second item of software transmits a request to the first item of software at 14, the first item of software verifies at 15 and 16 that the second item of software on the terminal does indeed have the pairing key $k'_a$ before responding at 17.

If this is not the case, the first item of software refuses to operate, thus rendering the security application unavailable.

The control of possession of the pairing key is active, of the type "challenge-response" and does not therefore allow an attacker to replay data captured initially on an authorised mobile in order to replace it with a mobile which is not authorised. To reiterate, it should be noted that a process of the "challenge-response" type involves, for the first item of software, sending a challenge at 15, in the form of a random number, to the second item of software, this second item of software encrypting it with the key $k'_a$ thereof and returning the result to the first item of software at 16 so that it verifies that the result corresponds to the anticipated value.

The method described in this manner allows it to be ensured that the second item of software is valid and is the one which has been correctly loaded on the terminal.

However, it appears that authorisation of the terminal itself before the transfer of the key $k'_a$ may allow security to be improved.

It is possible to envisage attacks which use items of spyware or spy hardware which intercept the pairing key $k'_a$ during the transfer thereof.

In a first variant, the authorisation is carried out in an agency, by authorised personnel, FIGS. 3 and 4.

Steps 10 to 12 for loading the two software modules and the pairing key $k_a$ in the SIM module are identical to those of the method described above.

However, step 12 for loading the second item of software is carried out in an agency with a member of authorised personnel who verifies that the terminal is correctly configured to receive the security application. It may be noted that, for the quality of this verification, the terminal must have adequate means for verification and presentation of the results.

Two methods of the pairing are possible depending on whether the capacity of the agency to carry out this pairing operation is controlled remotely by the operator or locally by the SIM card.

In the first method, FIG. 3, the authorised agent launches the second item of software on the terminal which opens a secure session with the server 2 at 20.

The second item of software, at 21, requests the agent to authenticate himself using a password which is sent at 22 to the server 2 of the operator for verification.

If the verification is positive, the server sends at 23 the pairing key k'a to the second item of software which stores it in a secure storage zone.

In the second method, FIG. 4, the authorised agent launches the second item of software on the terminal. This requests the agent to authenticate himself at 21 using a password which is sent at 25 to the SIM card 5 for verification.

If the verification is positive, the SIM card 5 sends at 26 the pairing key $k'_a$ to the second item of software which stores it in a secure storage zone.

It should be noted that, in this second method, the transfer of the key $k'_a$ on the SIM-mobile connection 6 does not present a problem since this procedure is used in a secure environment (agency) where the installation of cables, extension cables, etc... is impossible.

In a variant, the password of the agent can be modified in accordance with the terminal 4 or the SIM card 5. The modifier may be, for example, the series number of the SIM card or the terminal or the like.

The modifier is transmitted to the operator who derives the password therefrom and transmits this to the authorised agent in a secure manner using means which are completely independent of the terminal and the SIM card thereof.

In another variant of the method, it is found that a number of mobile terminals have security modules which are capable of containing unique identifiers and encryption keys and algorithms.

Based on the assumption that the mobile terminal has a dual RSA key and a certificate transmitted by an authority whose public key is known, the manual authorisation by an agent in an agency may be replaced by control of the terminal based on authentication of the dual keys and the certificate, either by the operator or by the SIM card. Since this method of authentication is well known to the person skilled in the art, it will not be described in greater detail.

The other steps of the method (transfer of pairing keys and control thereof) remain unchanged.

If a plurality of sensitive applications must coexist in the same terminal, it is possible to combine their pairing functions both at the terminal side and at the SIM card side.

A second application is thus composed of a third item of software which is loaded on the SIM card and the complementary item of software thereof which operates on the terminal.

This application does not concern the pairing but is dependent on a successful pairing.

The third item of software thus responds to a request from the complementary item of software thereof only after having verified with the first item of software that the second item of software is in valid possession of a pairing key, that is to say, that the pairing is valid.

This verification may, for example, involve verifying the state of a flag which is activated by the first item of software after the success, or failure, of the pairing procedure.

It should be noted that, by limiting the first and second items of software to a pairing function, it may be advantageous to fix the second item of software in a zone which cannot be modified by means of downloading. It then becomes possible to provide these two items of software with complementary functions.

A first function involves securing the connection means between the terminal and the SIM card by encrypting the data transferred (protection against attacks of the "man in the middle" type).

In conventional manner, the pairing keys $k_a$ and $k'_a$ are used in order to define a session key $k_i$ which allows the data exchanged between the terminal and the SIM card to be encrypted.

A second function involves verifying the software configuration of the terminal. The second item of software can transmit to the SIM information relating to the hardware and software configuration of the terminal (for example, configuration tables, summary of programmes such as the operating system of the mobile telephone) via the secure connection means described above. It is thus possible for the first item of software of the SIM card to compare these "current" configuration data with the values stored previously and, if there are differences, to position flags in accordance with the difference noted. It is possible for the third item of software, at the SIM side, to test these flags and to decide whether to continue or to stop. These flags which mark a configuration development can be read remotely, with the configuration information mentioned above, and optionally reset to zero, under the control of the transmitting operator of the SIM card.

To summarise, the system for securing a telecommunications terminal which is connected to a terminal user identification module therefore comprises:

means for secure loading and storage of a first item of software which comprises a pairing key in the identification module;

means for secure loading of a second item of software which is capable of operating in conjunction with the first item of software on the telecommunications terminal, which means are connected to means for secure loading and storage of a pairing key of the second item of software, and means for communicating between the first and second items of software comprising means for validating the pairing key of the second item of software which are capable of authorising the communication upon verification with the true value of possession of the pairing key by the second item of software.

The telecommunications terminal comprising means for communicating with a user identification module also comprises means for loading, storing and executing an item of software which is capable of operating with an item of software present on the identification module, and means for secure storage of a pairing key, which means are connected to means for validating this pairing key using the item of software which is present on this identification module.

With regard to the user identification module associated with the telecommunications terminal, it comprises means for secure loading and storage of a pairing key which corresponds to a pairing key which is stored on the terminal and an item of software which is capable of operating with an item of software which is present on the terminal, which means are connected to means for validating the pairing key of the terminal from the pairing key of the module, which means are capable of authorising communication between the two items of software only when the pairing key of the terminal is valid.

As has been explained above, the method described is used by a software product which comprises a first module which is used on a telecommunications terminal and a second module which is used on a module for identification of a user of the telecommunications terminal.

The method and the system described in this manner, by pairing a terminal with the SIM card thereof, therefore advantageously allow the security to be improved for the applications whose first module is loaded on the SIM card and whose second, complementary module is loaded in the terminal.

The invention claimed is:

1. A method for securing a telecommunications terminal containing a terminal user identification module, comprising:
   a step of carrying out a procedure for pairing the terminal with the identification module, comprising the sub-steps of:
   loading from a server in a secure manner a first item of software which comprises a pairing key on the identification module;
   loading from the server in a secure manner a second item of software which is capable of operating in conjunction with the first item of software on the telecommunications terminal;
   transmitting from the server a pairing key which corresponds to that of the first item of software to the second item of software;
   storing the pairing key transmitted in a secure storage zone of the telecommunications terminal;
   prior to any response from the first item of software to a request from the second item of software, verifying by the first item of software in said module that the pairing key of the second item of software stored on the communications terminal is valid;
   responding to the request when and only when the second item of software is in valid possession of the pairing key.

2. The method for securing a telecommunications terminal according to claim 1, wherein the transmission of the pairing key to the second item of software is conditional upon a procedure for authorising the telecommunications terminal.

3. The method for securing a telecommunications terminal according to claim 2, wherein since the terminal has means for identification and authentication of the terminal, the procedure for authorising the terminal is carried out automatically by means of verification, by the first item of software loaded on the identification module, or by an authentication server, of the validity of the identification and authentication means.

4. The method for securing a telecommunications terminal according to claim 3, wherein the identification and authentication means comprise an RSA key pair and a certificate transmitted by a certification authority and the verification of the validity of the means includes authentication of the RSA key pair and the certificate.

5. The method for securing a telecommunications terminal according to claim 1, wherein the verification of the possession of the pairing key by the second item of software is carried out via a "challenge-response" process from the first item of software to the second item of software.

6. The method for securing a telecommunications terminal according to claim 1, wherein the identification module comprises at least a third item of software which is capable of operating with a complementary item of software loaded on the terminal and responds to a request from the complementary item of software thereof only after having verified with the first item of software that the second item of software is in valid possession of a pairing key.

7. The method for securing a telecommunications terminal according to claim 1, wherein the pairing key serves to establish a session key which allows the exchanges between the terminal and the identification module to be encrypted.

8. The method for securing a telecommunications terminal according to claim 1, wherein the verification of the pairing key by the first item of software further involves the positioning of flags which mark a difference between the configuration recorded in the identification module and the current configuration of the telecommunications terminal.

9. The method for securing a telecommunications terminal according to claim 8, wherein the flags and the configuration information may be read and updated in a secure manner by means of an authentication server.

10. A system for securing a telecommunications terminal containing a terminal user identification module, comprising:
   means for secure loading from a server and storage of a first item of software comprising a pairing key in the identification module;
   means for secure loading from the server of a second item of software which is capable of operating in conjunction with the first item of software on the telecommunications terminal;
   means for secure loading from the server and storage of a pairing key of the second item of software; and
   means for communicating between the first and the second item of software comprising means for validating the pairing key of the second item of software which are capable of authorising communication only upon verification by the first item of software that the second item of software is in valid possession of the pairing key.

11. A telecommunications terminal which comprises means for communicating with a user identification module contained in the telecommunications terminal, comprising:
   means for loading from a server, storing and implementing a second item of software which is capable of operating with a first item of software which is present on the identification module; and
   means for secure storage of a pairing key, said means for secure storage being connected to means for validating the pairing key using the first item of software which is present on the identification module.

12. A user identification module which comprises means for communicating with a telecommunications terminal containing the user identification module, comprising:
   means for secure loading from a server and storage of a pairing key which corresponds to a pairing key which is stored on the terminal, and a first item of software which is capable of operating with a second item of software which is present on the terminal; and
   means for validating the pairing key of the terminal from the pairing key of the module, means for validating being capable of authorising communication only after verification that the second item of software is in valid possession of the pairing key.

13. A software product which comprises a first module useable on a telecommunications terminal and a second module useable on a module for identification of a user of the telecommunications terminal, configured to implement the method according to claim 1.

14. A method for securing a telecommunications terminal according to claim 2, wherein the verification of the possession of the pairing key by the second item of software is carried out via a "challenge-response" process from the first item of software to the second item of software.

15. A method for securing a telecommunications terminal according to claim 3, wherein the verification of the possession of the pairing key by the second item of software is carried out via a "challenge-response" process from the first item of software to the second item of software.

16. A method for securing a telecommunications terminal according to claim 4, wherein the verification of the possession of the pairing key by the second item of software is carried out via a "challenge-response" process from the first item of software to the second item of software.

17. A method for securing a telecommunications terminal according to claim 2, wherein the identification module comprises at least a third item of software which is capable of operating with a complementary item of software loaded on the terminal and responds to a request from the complementary item of software thereof only after having verified with the first item of software that the second item of software is in valid possession of a pairing key.

18. A method for securing a telecommunications terminal according to claim 3, wherein the identification module comprises at least a third item of software which is capable of operating with a complementary item of software loaded on the terminal and responds to a request from the complementary item of software thereof only after having verified with the first item of software that the second item of software is in valid possession of a pairing key.

19. A method for securing a telecommunications terminal according to claim 4, wherein the identification module comprises at least a third item of software which is capable of operating with a complementary item of software loaded on the terminal and responds to a request from the complementary item of software thereof only after having verified with the first item of software that the second item of software is in valid possession of a pairing key.

20. A method for securing a telecommunications terminal according to claim 2, wherein the pairing key serves to establish a session key which allows the exchanges between the terminal and the identification module to be encrypted.

* * * * *

UNITED STATES PATENT AND TRADEMARK OFFICE
CERTIFICATE OF CORRECTION

PATENT NO. : 8,588,415 B2  Page 1 of 1
APPLICATION NO. : 11/791483
DATED : November 19, 2013
INVENTOR(S) : Pailles et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1738 days.

Signed and Sealed this
Twenty-second Day of September, 2015

Michelle K. Lee
*Director of the United States Patent and Trademark Office*